(No Model.)

W. A. WICKS.
APPARATUS FOR PRESERVING FRUIT, &c.

No. 303,393. Patented Nov. 25, 1884.

WITNESSES:

INVENTOR.
William A. Wicks
By Benj. Price
Attorney.

UNITED STATES PATENT OFFICE.

WILLIAM A. WICKS, OF BALTIMORE, MARYLAND.

APPARATUS FOR PRESERVING FRUIT, &c.

SPECIFICATION forming part of Letters Patent No. 308,393, dated November 25, 1884.

Application filed December 22, 1883. (No model.)

*To all whom it may concern:*

Be it known that I, WILLIAM A. WICKS, of the city of Baltimore and State of Maryland, have invented a new and useful Improvement in the Method of Preserving Fruits, Meats, Vegetables, &c., as well as in apparatuses for that purpose, of which the following is a full and clear description.

My invention relates to that form of apparatus and process known as the "pressure preserving process," by which cans containing fruits, vegetables, and meats are placed in a steam-tight cylinder, and the contents of the cans cooked by steam or hot water introduced therein and allowed to remain until the contents are sufficiently cooked. Apparatuses of this class require much attention, and it is important that the pressure within the cylinder and surrounding the cans in the crates should be the same, approximately, as that within the cans. When the equality of the pressures is destroyed—that is to say, when that within the cans is greater than the pressure surrounding them—the can-heads will be bulged out. This causes a weakening and leakage at the joints, whereby the food contained in the cans, otherwise well packed and cooked, is frequently spoiled and lost. This excess of pressure within the cans occurs while the goods are undergoing the process of cooking, as well as when they are cooling after being cooked.

My invention relates to an apparatus and method whereby the relative pressures inside and outside of the cans may be ascertained at all times, as well as to means by which they may be equalized and regulated.

Figure 1:
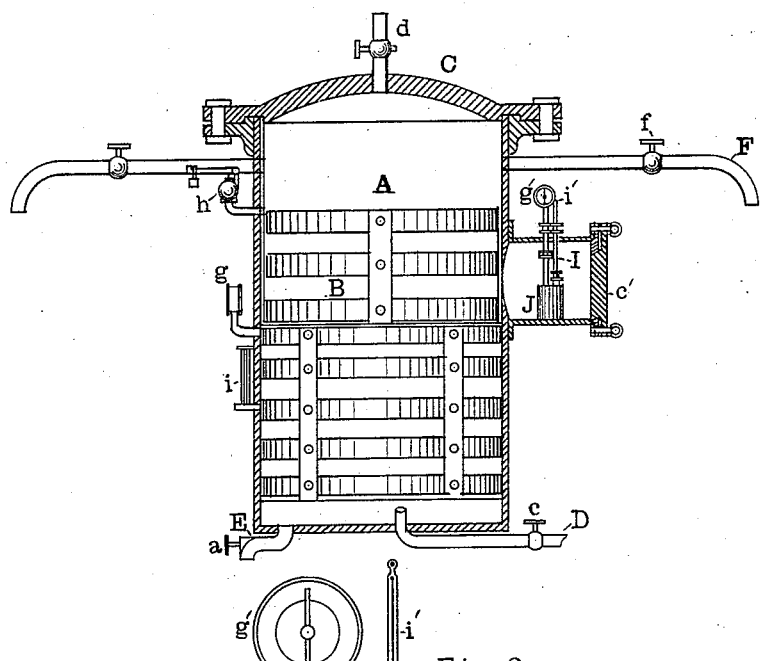
Figure 2:
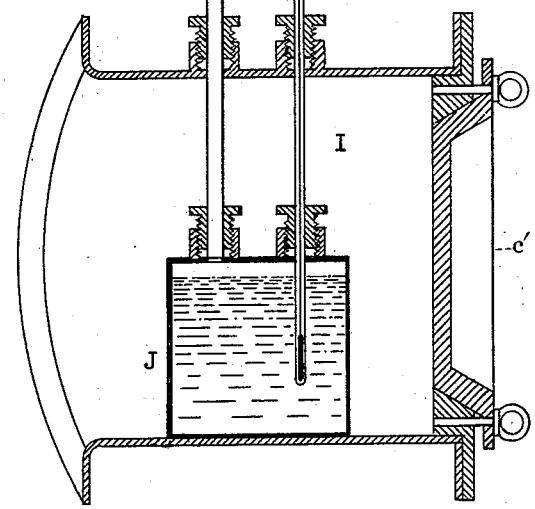

The accompanying drawings illustrate one form in which the invention may be embodied, of which Figure 1 is a vertical sectional view of the apparatus, showing the cooking-cylinder and the dome attachment. Fig. 2 is an enlarged sectional view of the dome attachment, showing the vessel within, with its pressure-gage and thermometer.

A, Fig. 1, is the cylinder into which the crates or baskets B are introduced. The cans containing fruit, vegetables, meats, &c., are placed within the crates before they are put into the cylinder.

C is a cover for the cylinder, designed to be steam-tight.

D is a steam inlet-pipe connecting the cylinder with a boiler or other steam receptacle, or generator. This pipe is provided with the cock $c$, to regulate the supply of steam from the generator to the cylinder.

E is a drain-pipe provided with the cock $a$, to let off the steam and water when required. Upon the top of the cylinder is the cock $d$, by means of which the steam within the cylinder may be let off as required.

$g$ is a pressure-gage to indicate the pressure within the cylinder and upon the outside of the cans.

$h$ is a safety-valve, which may be set to the desired point, and $i$ is a thermometer by which the temperature within the cylinder is indicated.

Attached to the cooking-cylinder I have placed a dome or receptacle, (indicated on the drawings by the letter I.) This receptacle may be attached to any part of the cylinder.

$C'$ is the cover or door to the receptacle, and may be made in the form shown in the drawings or in any other form, to be opened and closed steam-tight, as required. Within the dome or receptacle is placed the can or vessel J, provided with the tube communicating with the steam-gage $g'$, located outside of the dome or receptacle. This tube may be cut off a short distance above the vessel J, and provided with a suitable coupling or other device to attach it to the tube of the steam-gage, or it may extend directly into a stuffing-box on the head of the can, and be drawn out when the can is removed. The tube F leads to a pump or receptacle containing air or other gas under pressure, and is provided with the cock $f$, to regulate the supply of compressed air to the cylinder when required.

It may be desirable to operate the apparatus by obtaining the temperatures inside and outside of the cans, as the pressures and temperatures bear a relative proportion to each other, or, as is frequently the case, both the pressures and temperatures are desired to be ascertained. I have therefore provided the apparatus with the thermometer marked $i'$ in the drawings.

It will be readily seen from the above description that the dome or receptable I is in reality an additional cylinder, subject to all the circumstances of pressure and temperature as the cylinder A. The can or vessel J is also subject to all the conditions of the cans in the crates, with the same pressure and temperature on the outside. Now, if the can J be filled with the liquid at about the temperature of the food and liquid in the cans in the crates and placed within the receptacle I and the joints closed steam-tight, the steam-gage $g$ and the thermometer $i$ will indicate the pressure and temperature within the cylinder and dome and surrounding the cans in the crates, as well as the can J in the dome, while the pressure-gage $g'$ and the thermometer $i'$ will indicate the temperature and pressure within the can J, and consequently the pressure and temperature within the cans in the crates. When the pressure becomes unequal, which is known by observing the difference between the gages or thermometers, the cocks provided for regulating the inlet and escape of steam are used to equalize them and keep up a regular and equalized pressure upon both sides of the can-heads. The tube F, leading to a pump or receptacle for holding compressed air, may also be used to equalize the pressures—that is to say, when the pressure within the can is ascertained to be increasing, the cock $f$ is opened to allow an additional pressure to be exerted within the cylinder and surrounding the cans. Should the compressed air thus entering the cylinder tend to condense the steam therein, provision may be made for heating it before it is introduced into the cylinder.

My invention is intended to apply to preserving apparatuses wherein the provisions are cooked by the use of hot water, as well as the steam method above described.

What I claim is—

1. A pressure preserving apparatus provided with means for ascertaining the pressure inside of the cans.

2. A pressure preserving apparatus provided with the dome or receptacle I, containing the vessel J, provided with the pressure-gage $g'$, substantially as described.

3. A pressure preserving apparatus provided with means for ascertaining the temperature inside of the cans, substantially as described.

4. A pressure preserving apparatus provided with the dome or receptacle I, containing the vessel J, provided with the thermometer $i$, substantially as and for the purpose described.

5. A pressure preserving apparatus provided with means for ascertaining the pressures inside and outside of the cans during the process of cooking, substantially as described.

6. A pressure preserving apparatus provided with means for ascertaining the temperatures inside and outside of the cans during the process of cooking, substantially as described.

7. A pressure preserving apparatus provided with means for ascertaining and maintaining in equilibrium the pressures inside and outside of the cans during the process of preserving, substantially as described.

8. In a pressure preserving apparatus, the cylinder A, provided with the pressure-gage $g$, in combination with the dome or receptacle I, containing the vessel J, provided with the pressure-gage $g'$, substantially as and for the purposes described.

9. In a pressure preserving apparatus, the cooking-cylinder A, provided with the thermometer $i$, in combination with the dome or receptacle containing the vessel J, provided with the thermometer $i'$, substantially as and for the purposes described.

10. In a pressure preserving apparatus, the cooking-cylinder A, provided with the gage $g$ and thermometer $i$, the dome or receptacle I, containing the can or vessel J, provided with the pressure gage $g'$ and the thermometer $i'$, and means for maintaining in equilibrium the pressures inside and outside of the cans, substantially as described.

WILLIAM A. WICKS.

Witnesses:
SAML. I. HOYT,
H. ROZIER DULANY.